US012717576B2

(12) United States Patent
Wilkinson

(10) Patent No.: US 12,717,576 B2
(45) Date of Patent: Aug. 25, 2026

(54) VERSION AGNOSTIC CENTRALIZED STATE MANAGEMENT IN VIDEO GAMES

(71) Applicant: Electronic Arts Inc., Redwood City, CA (US)

(72) Inventor: Robert Joseph Wilkinson, Santa Clarita, CA (US)

(73) Assignee: Electronic Arts Inc., Redwood City, CA (US)

( * ) Notice: Subject to any disclaimer, the term of this patent is extended or adjusted under 35 U.S.C. 154(b) by 38 days.

(21) Appl. No.: 18/431,844

(22) Filed: Feb. 2, 2024

(65) Prior Publication Data

US 2024/0329979 A1 Oct. 3, 2024

Related U.S. Application Data

(60) Provisional application No. 63/455,734, filed on Mar. 30, 2023.

(51) Int. Cl.
*G06F 8/71* (2018.01)
*A63F 13/77* (2014.01)

(52) U.S. Cl.
CPC ................ *G06F 8/71* (2013.01); *A63F 13/77* (2014.09)

(58) Field of Classification Search
CPC ................................... G06F 8/71; A63F 13/77
See application file for complete search history.

(56) References Cited

U.S. PATENT DOCUMENTS 5,808,625 A * 9/1998 Picott ........................ G06T 1/00 345/440
6,535,215 B1 * 3/2003 DeWitt .................. G06T 13/40 345/473
6,999,084 B2 * 2/2006 Mochizuki ............. G06T 13/40 345/473
8,508,537 B2 * 8/2013 Collard .................. G06T 13/00 345/474
10,226,708 B2 * 3/2019 Bruzzo .................. A63F 13/30
10,918,937 B2 * 2/2021 Nelson, Jr. ............ A63F 13/335
11,184,216 B2 * 11/2021 Jiang .................. H04L 41/0233
11,531,556 B2 * 12/2022 Xiao ..................... G06F 3/0488
2020/0097268 A1 * 3/2020 Olsson ...................... G06F 8/38
2020/0097295 A1 * 3/2020 Xu ........................... G06F 9/54
2022/0374702 A1 * 11/2022 Kushmerick ........ G06N 3/0464
2024/0289187 A1 * 8/2024 Fontaine ................ G06F 8/433

* cited by examiner

*Primary Examiner* — Douglas M Slachta
(74) *Attorney, Agent, or Firm* — Knobbe, Martens, Olson & Bear, LLP

(57) ABSTRACT

A state system providing version agnostic centralized state management can use node graphs corresponding to virtual entities to maintain a world state among any version of a video game. As states to virtual entities change, corresponding nodes of the node graph are updated in response to the state change to account for and store the state change. As a data structure referencing, associating, and/or corresponding to virtual entities themselves, the node graph can facilitate centralized state management for a video game in a version agnostic manner. Additionally, the state system is also configured to validate node dependencies of a node graph when a corresponding change in state of a corresponding virtual entity occurs during gameplay, to avoid and/or prevent game state errors.

20 Claims, 6 Drawing Sheets

400

INTAKE MODULE
310

CONFIGURATION MODULE
320

VALIDATION MODULE
330

USER INTERFACE MODULE
340

STATE SYSTEM 300

FIG. 3

VERSION AGNOSTIC CENTRALIZED STATE MANAGEMENT IN VIDEO GAMES

CROSS REFERENCE TO RELATED APPLICATIONS

This application claims the benefits of U.S. Patent Application No. 63/455,734 filed on Mar. 30, 2023 and titled "VERSION AGNOSTIC CENTRALIZED STATE MANAGEMENT IN VIDEO GAMES", which is incorporated by reference herein in its entirety.

BACKGROUND

As video games grow in size and complexity the amount of state data to manage also grows. This growth makes the task of state data management increasingly difficult. This task is further compounded when aspects of a video game that include or have states—such as virtual interactive environments—are subject to change over the course of development. As these aspects of a video game change, the issue of version incompatibility from state differences arises. The issue of version incompatibility can cause game saves to be incompatible between versions. As such, a version agnostic centralized state management system configured to maintain and validate states among any version and/or iteration of a video game or portion thereof would be advantageous in the field of state data management.

SUMMARY OF SOME EMBODIMENTS

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

In some aspects, the techniques described herein relate to a system including: one or more processors; and one or more memory devices communicatively coupled to the one or more processors, the one or more memory devices storing computer-executable instructions corresponding to a video game that, among a gameplay session of the video game during runtime execution, causes at least one of the one or more processors to maintain a world state to a plurality of virtual entities by: accessing a node graph including a plurality of nodes, wherein each node includes data corresponding to at least: (i) an association to a virtual entity, (ii) state data of the associated virtual entity, and (iii) one or more node dependencies; wherein a node dependency indicates a dependent node of a node. providing state data to the plurality of virtual entities based at least in part on the node graph; updating state data of a node in response the state of the virtual entity to associated to the node changing during the gameplay session; validating at least one of the one or more node dependencies of the node updating state data, wherein the validation includes updating the state data of a corresponding dependent node.

In some aspects, the techniques described herein relate to a system, wherein the node graph is a data structure corresponding to a state data hierarchy of the video game.

In some aspects, the techniques described herein relate to a system, wherein one or more nodes among the node graph include data corresponding to at least: (i) an association to a secondary node graph including a plurality of nodes, and (ii) a node dependency.

In some aspects, the techniques described herein relate to a system, wherein user interaction among the gameplay session causes a change in state to a virtual entity.

In some aspects, the techniques described herein relate to a system, wherein the updating state data of nodes includes saving the node graph among a datastore to update the world state.

In some aspects, the techniques described herein relate to a system, wherein a validation of node dependencies is based at least in part on the state data hierarchy of the video game.

In some aspects, the techniques described herein relate to a system, wherein a validation of a node dependency includes the validation of a node dependency corresponding to the dependent node.

In some aspects, the techniques described herein relate to a computer implemented method to maintain a world state to a plurality of virtual entities among a gameplay session including: accessing a node graph including a plurality of nodes, wherein each node includes data corresponding to at least: (i) an association to a virtual entity, (ii) state data of the associated virtual entity, and (iii) one or more node dependencies; wherein a node dependency indicates a dependent node of a node. providing state data to the plurality of virtual entities based at least in part on the node graph; updating state data of a node in response the state of the virtual entity to associated to the node changing during the gameplay session; validating at least one of the one or more node dependencies of the node updating state data, wherein the validation includes updating the state data of a corresponding dependent node.

In some aspects, the techniques described herein relate to a system, wherein the node graph is a data structure corresponding to a state data hierarchy of the video game.

In some aspects, the techniques described herein relate to a system, wherein one or more nodes among the node graph include data corresponding to at least: (i) an association to a secondary node graph including a plurality of nodes, and (ii) a node dependency.

In some aspects, the techniques described herein relate to a system, wherein user interaction among the gameplay session causes a change in state to a virtual entity.

In some aspects, the techniques described herein relate to a system, wherein the updating state data of nodes includes saving the node graph among a datastore to update the world state.

In some aspects, the techniques described herein relate to a system, wherein a validation of node dependencies is based at least in part on the state data hierarchy of the video game.

In some aspects, the techniques described herein relate to a system, wherein a validation of a node dependency includes the validation of a node dependency corresponding to the dependent node.

In some aspects, the techniques described herein relate to a non-transitory computer readable medium storing instructions that, when executed by one or more processors, causes the one or more processors to maintain a world state to a plurality of virtual entities among a gameplay session including: accessing a node graph including a plurality of nodes, wherein each node includes data corresponding to at least: (i) an association to a virtual entity, (ii) state data of the associated virtual entity, and (iii) one or more node dependencies; wherein a node dependency indicates a dependent node of a node. providing state data to the plurality of virtual entities based at least in part on the node graph; updating state data of a node in response the state of the virtual entity to associated to the node changing during the gameplay session; validating at least one of the one or more node dependencies of the node updating state data, wherein the validation includes updating the state data of a corresponding dependent node.

In some aspects, the techniques described herein relate to a system, wherein the node graph is a data structure corresponding to a state data hierarchy of the video game.

In some aspects, the techniques described herein relate to a system, wherein one or more nodes among the node graph include data corresponding to at least: (i) an association to a secondary node graph including a plurality of nodes, and (ii) a node dependency.

In some aspects, the techniques described herein relate to a system, wherein user interaction among the gameplay session causes a change in state to a virtual entity.

In some aspects, the techniques described herein relate to a system, wherein the updating state data of nodes includes saving the node graph among a datastore to update the world state.

In some aspects, the techniques described herein relate to a system, wherein a validation of node dependencies is based at least in part on the state data hierarchy of the video game.

BRIEF DESCRIPTION OF THE DRAWINGS

This disclosure will be more fully understood from the following detailed description taken in conjunction with the accompanying drawings, in which:

FIG. 3 illustrates an embodiment of a state system.

DETAILED DESCRIPTION

Figure 1:
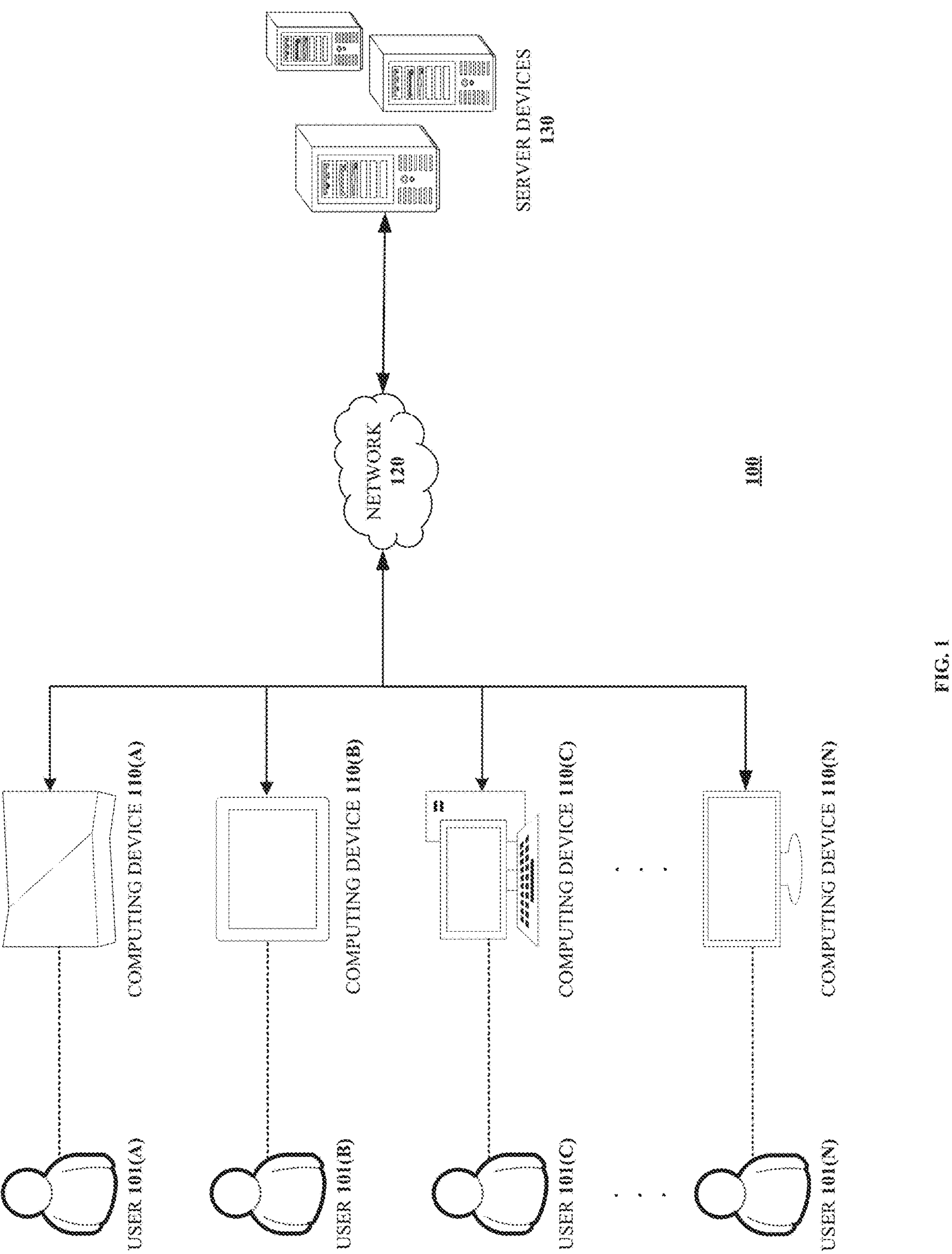
FIG. 1 illustrates an embodiment of a computing environment providing version agnostic centralized state management of video games.

The systems and methods described herein provide for a version agnostic centralized state management system, hereinafter referred to as "state system" in short, among video games and/or virtual social spaces.

Decentralized state management is one approach to state management among video games. As known to a person of ordinary skill in the art, decentralized state management corresponds to each virtual entity—or instance thereof—managing and/or maintaining its own state(s) over the course of gameplay.

One issue with decentralized state management is the game save incompatibility of game saves among different versions of a video game that occur over the course of development of a video game; such as when there are changes corresponding to virtual entities. Another issue with decentralized state management is progression locking and/or region locking resulting from a lack of automated validation of state dependencies and/or lack of state dependencies.

The state system solves these issues by using node graphs and automated state dependency validation to provide version agnostic centralized state management. The node graphs used by state system define and maintain a state data hierarchy over the course of development and gameplay, allowing changes to virtual entities (e.g., among content creation for a video game) to be accounted for with minimal to no configuration of a node graph, thereby making the node graphs version agnostic. Furthermore, the automated state dependency validation allows for states and/or state dependencies of virtual entities to be appropriately validated during runtime to overcome any issues arising from exploits or bugs during gameplay.

"State data hierarchy" refers to a hierarchy of states corresponding to virtual entities among a video game. State data hierarchies are node graphs providing a structure of state dependencies (e.g., a flow chart of how a state of a virtual entity is expected to change over the course of gameplay). Therefore, a state system can use state data hierarchies to define and/or track a "world state" or "global state" of a video game—or any subset or portion thereof.

The node graphs, as data structures, represent the world state of a video game as a state data hierarchy through references to virtual entities, among other things. As changes to virtual entities occur, the state system is configured to update a node graph when applicable, such as when there is a change to the state data hierarchy.

For simplicity, "state data hierarchies" are used interchangeably with "node graphs", and "node" is used interchangeably with "state" and "state data". For simplicity, "state data hierarchies" and "node graphs" are representative of the world state of a video game, or portion thereof.

"Virtual entity" and "virtual actor" are used interchangeably and are commonly known as referring to a virtual aspect of a video game: such as virtual interactive environments (e.g., levels), virtual objects, and virtual characters (e.g., player characters and non-player characters), gameplay systems, progression systems, user configurations, settings, objectives, scenes, events, and cameras, among other things.

Overview

FIG. 1 illustrates an example embodiment of computing environment 100 to design, develop, test, and/or play a video game—or one or more aspects, features, and/or services thereof—among other things. Computing environment 100 includes communicatively coupled hardware devices. In some embodiments, one or more hardware devices among computing environment 100 include computer executable instructions configured with a version agnostic centralized state management system.

As shown, computing environment 100 including users 105(A), 105(B), 105(C), and 105(N) (collectively referred to herein as "105" or "users 105") and computing devices 110(A), 110(B), 110(C), and 110(D) (collectively referred to herein as "110 or "computing devices 110") that are communicatively coupled to server devices 130 over network 120. In some embodiments, "N" of user 105(N) and computing devices 110(N) is an arbitrary real value that denotes an "A through N" number of users 105 and/or computing devices 110 among computing environment 100.

Users 105 can be players, developers, designers and/or automated agents (hereinafter "agent" in short), among other types. In some embodiments, there is a one-to-one correspondence between the users 105 and the computing devices 110. In some embodiments, there is an N-to-one or one-to-N (wherein "N" is an arbitrary real value) correspondence between the users 105 and the computing devices 110. It should be understood that as described in the present disclosure, a "user" on or of a computing device is synonymous with a "player", "developer", "designer" or an "agent". An agent, as known to a person of ordinary skill in the art, can be configured by way of a machine learning model and/or software to automate one or more tasks; such as, for example, playing or testing a video game.

Computing devices 110 are exemplary hardware devices including computer executable instructions configured for designing, developing, maintaining, monitoring, analyzing, testing, updating, streaming, and/or playing a video game—or one or more aspects, features, and/or services thereof—among other things. As illustrated by way of example in the embodiment of FIG. 1, computing device 110(A) is a video game console; computing device 110(B) is a mobile device; computing device 110(C) is a personal computer; and computing device 110(D) is a display device. In some embodiments, two or more of the computing devices 110 are similar to one another—e.g., of a same type.

In some embodiments, user 105 provides input to computing devices 110 by way of one or more input devices and/or input methods corresponding and/or associated to computing devices 110, as known to a person of ordinary skill in the art. In some embodiments, computing devices 110 can provide output to users 105 by way of one or more output devices and/or output methods corresponding and/or associated to computing devices 110, as known to a person of ordinary skill in the art.

Network 120 communicatively couples computing devices 110 and server devices 130, among other hardware devices. In some embodiments, network 120 includes any method of private and/or public connectivity, networking, and/or communication between or among hardware devices known in the arts. As non-limiting examples, network 120 may include direct wired connections, Near Field Communication (NFC), a Local Area Network (LAN), a Virtual Private Network (VPN), an internet connection, or other communication methods of the like.

Server devices 130 are exemplary hardware devices including computer executable instructions configured to provide services (i.e., remote or cloud services) corresponding to designing, developing, maintaining, monitoring, analyzing, testing, updating, streaming, and/or playing of a video game—or one or more aspects and/or features thereof—among other things to computing devices 110 over network 120. The one or more hardware devices of server devices 130 can be communicatively coupled to one or more computing devices 110 over network 120, among other hardware devices and/or other networking methods.

The exemplary hardware devices of computing devices 110 and server devices 130 include at least one or more processors, graphic processors, memory, and storage, in addition to networking capabilities. In some embodiments, computing devices 110 include computer executable instructions configured to perform one or more functions, tasks, or services of and/or for service devices 130. In some embodiments, server devices 130 include computer executable instructions configured to perform one or more functions, tasks, or services of and/or for computing devices 110.

In some embodiments, computing devices 110 and server devices 130 include computer executable instructions configured to provide and/or enable remote access among hardware devices, such as over network 120. For example, computing device 110(A) may remote access computing device 110(C) and/or one or more hardware devices of server devices 130. In some embodiments, computing devices 110 include computer executable instructions configured to request and/or provide data to server devices 130, such as over network 120. In some embodiments, server devices 130 include computer executable instructions configured to request and/or provide data to computing devices 110, such as over network 120.

In some embodiments, there is an association of a user 105 to one or more user accounts of, or corresponding to, computing devices 110 and/or service devices 130. In some embodiments, there is an association of a user 105 to one or more user accounts corresponding to software and/or video games included, stored, and/or executed among computing devices 110 and/or service devices 130. In some embodiments, user accounts in association with a user 105 are validated by computing devices 110 and/or service devices 130 by one or more methods known to a person of ordinary skill in the art. In some embodiments, agents—as users 105—are deployed, controlled, and/or directed by computing devices 110 and/or service devices 130 by one or more methods known to a person of ordinary skill in the art to perform and/or automate one or more tasks among computing devices 110 and/or service devices 130, among other things.

Figure 2:
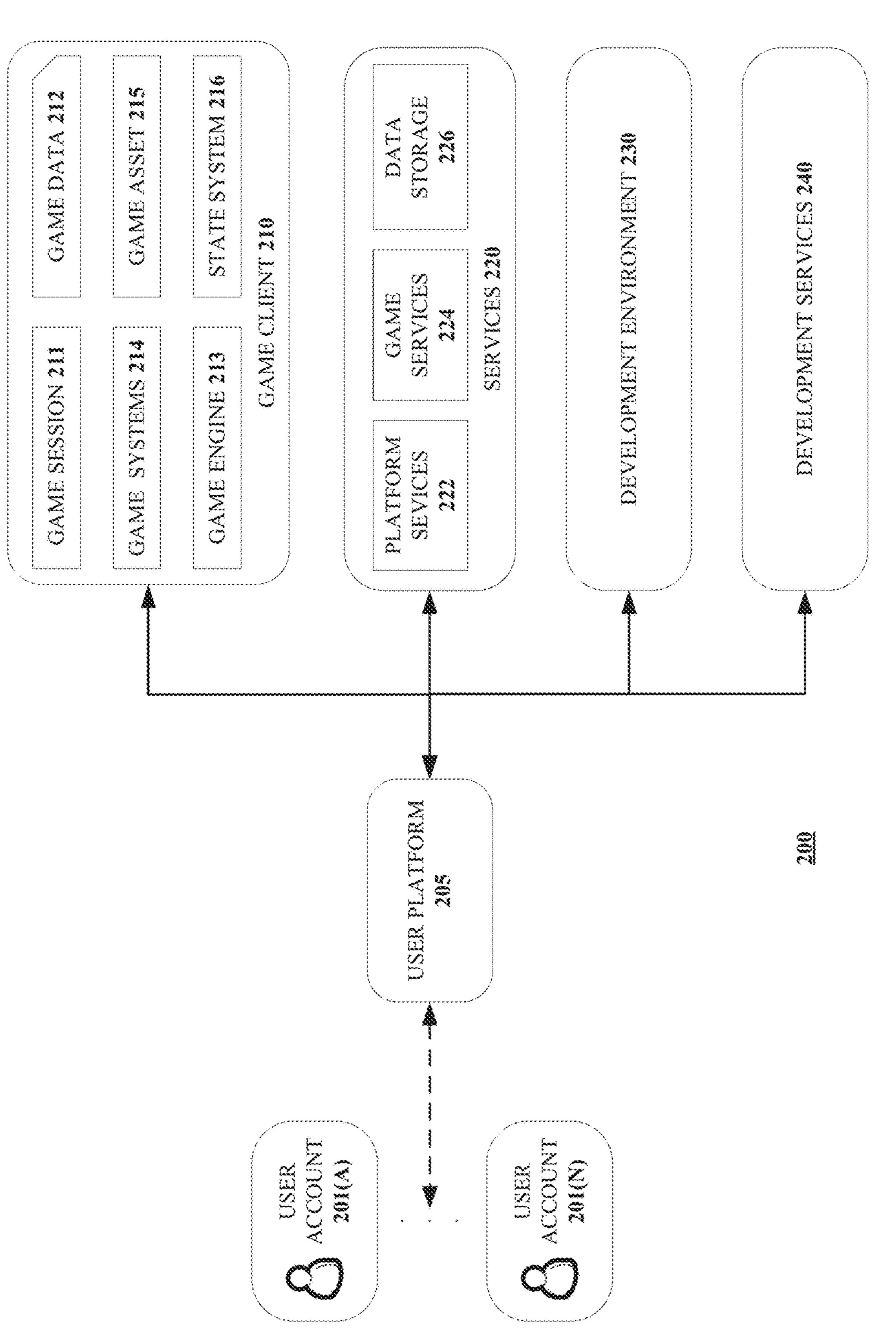
FIG. 2 illustrates an embodiment of a software environment providing version agnostic centralized state management of video games.

FIG. 2 illustrates an example embodiment of a software environment 200 to design, develop, test, and/or play a video game—or one or more aspects, features, and/or services thereof—among other things. Software environment 200 includes a number of software (i.e., computer executable instructions) distributed over—and/or executable on—one or more communicatively coupled hardware devices, similar to computing device 110 and server device 130 over network 120 of FIG. 1. In some embodiments, the software among software environment 200 provides a version agnostic centralized state management system for defining and managing states of virtual entities, such as among a video game.

Software environment 200 includes user platform 205, game client 210, service 220, development environment 230, and development service 240. In some embodiments, the software among software environment 200 is configured with computer executable instructions to communicate data.

User platform 205 includes computer executable instructions configured to access and/or manage software and/or services associated with user platform 205, among other things; such as, for example, game clients 210, services 220, development environment 230, and/or development services 240.

In some embodiments, user platform 205 supports and/or requires a "users account" for accessing and/or managing software and/or services associated with user platform 205. As illustrated by way of example in the embodiment of FIG. 2, user account 201(A) through user account 201(N) are accounts of users (similar to users 105 of FIG. 1) that correspond to user platform 205; wherein "N" is arbitrary real value used to denote an "A through N" amount of user accounts (herein collectively referred to as "201"). In some embodiments, each user account 201 may locally execute and/or remotely access or communicate with one or more of the software and/or services among software environment 200 from or on one or more hardware devices.

In some embodiments, user accounts 201 include data provided by users, such as a username, that identifies a user account 201 (and in turn a user) among software environment 200. In some embodiments, data corresponding to and/or communicated among software environment 200 can be associated to and/or with user platform 205 and one or more user accounts 201. In some embodiments, data corresponding to user platform 205—and one or more user accounts 201—is associated to or with game clients 210, services 220, development environment 230, and/or development service 240, among other things.

Game client 210 is software including, comprising, and/or composing a video game and/or virtual social space, or portion thereof. Game client 210 includes game client components (213, 214, 215, and 216) and game data 212 that can be utilized to produce and/or maintain game session 211; or multiples thereof.

Game session 211 is an instance of one or more virtual interactive environments of game client 210. In some embodiments, a virtual interactive environment includes one or more virtual levels and/or graphical user interfaces providing an interactive virtual area or virtual space for gameplay and/or socializing. For example, game session 211 can be among a game level or social space, which may include one or more player characters, non-player characters, quests, objectives, and other features, elements, or aspects known in the art. In some embodiments, game session 211 is produced and/or maintained in part by game data 212, game engine 213, game systems 214, and game assets 215, among other things; such as, for example, user platform 205 and/or services 220.

As a non-limiting example, a first instance of a game session may be of a first version of a first virtual interactive environment, while a subsequent instance of a game session may be of a subsequent version of the first virtual interactive environment, such that there are one or more changes or differences among the first virtual interactive environment between the two instances of the game session.

Game session 211 may include a number of player characters and/or non-player characters. Player characters of game session 211 can refer to controllable character models configured to facilitate or perform gameplay actions or commands. In some embodiments, a user or player can control and/or direct one or more player characters in a virtual interactive environment of game session 211. The term "non-player character" corresponds to character models that are not controlled and/or directed by players (commonly known as "NPCs"). An NPC can be configured with computer executable instructions to perform one or more tasks and/or actions among the gameplay of game session 211 (i.e., gameplay actions); such as with and/or without interaction with or from a player character.

The game session 211 may include a number of player objects. Player objects of game session 211 can refer to controllable objects, or models, used to facilitate or enable gameplay or other in-game actions. Player objects may be, for example, vehicles, vessels, aircraft, ships, tiles, cards, dice, pawns, and other in-game items of the like known to those of skill in the art. In some embodiments, a user or player can control or direct one or more player objects in game session 211, including, in some instances, by controlling player characters which in turn causes the objects to be controlled.

For simplicity, player characters and player objects are collectively referred to herein as player characters in some embodiments. It should be understood that, as used herein, "controllable" refers to the characteristic of being able and/or configured to be controlled and/or directed (e.g., moved, modified, etc.) by a player or user through one or more input means, such as a controller or other input device, by a player or user. As known to a person of ordinary skill in the art, player characters include character models configured to receive input.

Game data 212 is data corresponding to one or more aspects of game client 210, such as gameplay. In some embodiments, game data 212 includes data such as state data, simulation data, rendering data, and other data types of the like.

State data is commonly known as data describing a state of a player character, virtual interactive environment, and/or other virtual objects, actors, or entities—in whole or in part—at one or more instances or periods of time during a game session of a video game. For example, state data can include the current location and condition of one or more player characters among a virtual interactive environment at a given time, frame, or duration of time or number of frames.

Simulation data is commonly known as the underlying data corresponding to simulation (i.e., physics and other corresponding mechanics) to drive the simulation of a model or object in a game engine. For example, simulation data can include the joint and structural configuration of a character model and corresponding physical forces or characteristics applied to it at instance or period of time during gameplay, such as a "frame", to create animations, among other things.

Render Data is commonly known as the underlying data corresponding to rendering (e.g., visual and auditory rendering) aspects of a game session, which are rendered (e.g., for output to an output device) by a game engine. For example, render data can include data corresponding to the rendering of graphical, visual, auditory, and/or haptic output of a video game, among other things.

In some embodiments, gameplay session 211 is based in part on game data 212. During game session 211 (e.g., runtime execution), one or more aspects of gameplay (e.g. rendering, simulation, state, gameplay actions of player characters) uses, produces, generates, and/or modifies game data 212 or portion thereof. Likewise, gameplay events, objectives, triggers, and other aspects, objects, or elements of the like also use, produce, generate, and/or modify game data 212, or a portion thereof. In some embodiments, game data 212 includes data produced or generated over the course of a number of game sessions associated with one or more game clients 210.

Game data 212 may be updated, versioned, and/or stored periodically as a number of files to a memory device associated with game client 210, or remotely on a memory device associated with a game server or game service, such as data storage 226. Additionally, game data 212, or copies and/or portions thereof, can be stored, referenced, categorized, or placed into a number of buffers or storage buffers. A buffer can be configured to capture particular data, or data types, of game data 212 for processing and/or storage. These buffers can be used by game client 210, service 220, user platform 205, development environment 230, and/or development services 240 for performing one or more tasks, such as state management.

For simplicity, the terms "data", "game data", "game data", "state data", "simulation data", and "render data" can be used interchangeably to refer to the data of, or corresponding to, a video game.

Game client components (e.g., game engine 213, game systems 214, game assets 215, and 216) are portions or subparts of game client 210 that provide the underlying frameworks and software that support and facilitate features corresponding to gameplay, such as instancing game sessions that connect one or more user accounts for gameplay among a virtual interactive environment.

Game engine 213 is a software framework configured with computer executable instructions to execute computer executable instructions corresponding to a video game (e.g., game code). In some embodiments, game engine 213 is a distributable computer executable runtime portion of development environment 230. In some embodiments, game engine 213 and development environment 230 are game code agnostic.

In some embodiments, game engine 213 includes, among other things, a renderer, simulator, and stream layer. In some embodiments, game engine 213 uses game data (e.g, state data, render data, simulation data, audio data, and other data types of the like) to generate and/or render one or more outputs (e.g., visual output, audio output, and haptic output) for one or more hardware devices.

As used herein in some embodiments, a renderer is a graphics framework that manages the production of graphics corresponding to lighting, shadows, textures, user interfaces, and other effects or game assets of the like. As used herein in some embodiments, a simulator refers to a framework that manages simulation aspects corresponding to physics and other corresponding mechanics used in part for animations and/or interactions of gameplay objects, entities, characters, lighting, gasses, and other game assets or effects of the like.

As used herein in some embodiments, a stream layer is a software layer that allows a renderer and simulator to execute independently of one another by providing a common execution stream for renderings and simulations to be produced and/or synchronized (i.e., scheduled) at and/or during runtime. For example, a renderer and simulator of game engine 213 may execute at different rates (e.g., ticks, clocks) and have their respective outputs synchronized accordingly by a stream layer.

As used herein in some embodiments, game engine 213 also includes an audio engine or audio renderer that produces and synchronizes audio playback with or among the common execution of a stream layer. In some embodiments, an audio engine of game engine 213 can use game data to produce audio output and/or haptic output from game data. In some embodiments, an audio engine of game engine 213 can transcribe audio data or text data to produce audio haptic output.

Game systems 214 includes software configured with computer executable instructions that provide, facilitate, and manage gameplay features and gameplay aspects of game client 210. In some embodiments, game systems 214 includes the underlying framework and logic corresponding to gameplay of game client 210. For simplicity, game systems 214 are the "game code" that compose a video game of game client 210. As such, game systems 214 are used in part to produce, generate, and maintain gameplay among an instance of a virtual interactive environment, such as the gameplay among game session 211.

As used herein in some embodiments, game engine 213 and/or game systems 214 can also use and/or include Software Development Kits (SDKs), Application Program Interfaces (APIs), Dynamically Linked Libraries (DLLs), and other software libraries, components, modules, shims, or plugins that provide and/or enable a variety of functionality to game client 210; such as—but not limited to—graphics, audio, font, or communication support, establishing and maintaining service connections, performing authorizations, and providing anti-cheat and anti-fraud monitoring and detection, among other things.

Game assets 215 are digital assets that correspond to game client 210. In some embodiments, the game assets 215 can include virtual objects, character models, actors, entities, geometric meshes, textures, terrain maps, animation files, audio files, digital media files, font libraries, visual effects, and other digital assets commonly used in video games of the like. As such, game assets 215 are the data files used in part to produce the runtime of game client 210, such as the virtual interactive environments and menus. In some embodiments, game engine 213 and/or game systems 214 reference game assets 215 to produce game session 211.

For simplicity, "gameplay" can be used as a leading term to synonymously refer to corresponding elements associated with FIG. 2; such as, for example "gameplay account", "gameplay platform", "gameplay client", "gameplay session", "gameplay data", "gameplay engine", "gameplay systems", "gameplay assets", "gameplay services", among other similar uses.

State system 216 is a version agnostic centralized state management system for game client 210. State system 216 provides management of states for virtual entities corresponding to game client 210. For example, gameplay session 211 includes and/or uses virtual entities (e.g., game assets 215 and/or game systems 214). Game data 212 includes state data that corresponds to virtual entities. In some embodiments, game data 212—or the state data corresponding to virtual entities thereof—can be used and/or referenced by state system 216 for state management.

In some embodiments, state system 216 includes a user interface that enables a user to construct and/or configure a state data hierarchy as one or more node graphs. In some embodiments, a user can change and/or update the state of a virtual entity corresponding to a node graph of state system 216 through gameplay interactions among game session 211 and/or through the user interface of state system 216. In some embodiments, development environment 230 also includes a state system similar to state system 216.

In some embodiments, game client 210 can be played and/or executed on one or more hardware devices, such as computing devices 110 and server devices 130 of FIG. 1. In some embodiments, there are a number of game clients 210 that may include variations among one another: such as including different software instructions, components, graphical configurations, and/or data for supporting runtime execution among different hardware devices.

For example, multiple game clients 210 can be of the same video game wherein one game client 210 includes variations for support on a video game console (such as computing device 110(A) in FIG. 1), while another game client 210 includes variations for support on a mobile device (such as computing device 110(B) in FIG. 1). However, since the game clients are of the same video game, both game clients can connect to the same instance of a game session (such as game session 211) to enable user accounts 201 of user platform 205 to interact with one another by being communicatively coupled; such as by hardware devices running and/or accessing a game client 210 in communication with services 220.

Service 220 are software services including computer executable instructions configured to provide a number of services to user platform 205 and/or game client 210. As illustrated by way of example in FIG. 2, services 220 includes, but is not limited to, platform services 222, gameplay services 224, and data storage 226. In some embodiments, services 222 includes computer executable instructions configured and/or provided by development environment 230 and/or development services 240.

Platform services 222 includes computer executable instructions configured to provide anti-fraud detection, software management, user account validation, issue reporting, and other services corresponding to user platform 205 of the like.

Gameplay services 224 includes computer executable instructions configured to provide matchmaking services, game state management, anti-fraud detection, economy management, player account validation, and other services corresponding to gameplay of the like to game clients 210.

In some embodiments, platform services 222 and/or gameplay services 224 establish and maintain connections that, at least in part, facilitate gameplay in a game session of game client 210, such that game session 211 of game client 210 connects one or more users accounts 201 of user platform 205 for multiplayer gameplay and/or multi-user interaction among an instance of a virtual interactive environment.

Data storage 226 provides data storage management services to the software among software environment 200. In some embodiments, data communicated by and/or corresponding to elements 205, 201, 210, 220, 230, and 240 may be stored, versioned, and/or managed—as one or more files—to and/or by data storage 226 or one or more hardware devices corresponding to software environment 200.

In some embodiments, Game clients 210 and user platform 205 can communicate with service 220 over a network, such as network 120 illustrated in FIG. 1. In some embodiments, service 220 is provided by server devices 130 of FIG. 1. In some embodiments, game client 210 and/or user platform 205 can require a user account 201 to access one or more features of game client 210; such as social gaming features including multiplayer game sessions or player to player communications. Respectively, data, such as game data 212 corresponding to one or more game sessions of game client 210 can be associated to user accounts 201 in some embodiments.

Development Environment 230 is software enabling the development or maintenance of one or more aspects, features, tools, and/or services corresponding to one or more of the software among software environment 200. In some embodiments, development environment 230 is a collection of tools, frameworks, services, and other computer executable instructions and applications of the like, such as, for example, a video game development engine. In some embodiments, development environment 230 can utilize external software—such as components, modules, libraries, plugins, and other systems of the like—to extend or expand functionality and/or capabilities.

Development Services 240 are software services including computer executable instructions configured to provide services corresponding to user platform 205, game client 210, services 220 and/or development environment 230. In some embodiments, development services 240 provide services similar to functionality and capabilities of development environment 230, thereby allowing and/or enabling development for software corresponding to, and/or aspects of, software environment 200. In some embodiments, development services 240 provide services to mock and/or simulate one or more components, services, or aspects of user platform 205, game client 210, and/or services 220, thereby allowing and/or enabling testing and/or validation, among other things, for one or more aspects corresponding to software environment 200.

In some embodiments, software among or corresponding to software environment 200—and the corresponding systems and methods thereof—utilize machine learning. Machine learning is a subfield of artificial intelligence, which, to persons of ordinary skill of the art, corresponds to underlying algorithms and/or frameworks (commonly known as “neural networks” or “machine learning models”) that are configured and/or trained to perform and/or automate one or more tasks or computing processes. For simplicity, the terms “neural networks” and “machine learning models” can be used interchangeably and can be referred to as either “networks” or “models” in short.

In some embodiments, software among or corresponding to software environment 200—and the corresponding systems and methods thereof—utilize deep learning. Deep learning is a subfield of artificial intelligence and machine learning, which, to persons of ordinary skill of the art, corresponds to multilayered implementations of machine learning (commonly known as “deep neural networks”). For simplicity, the terms “machine learning” and “deep learning” can be used interchangeably.

As known to a person of ordinary skill in the art, machine learning is commonly utilized for performing and/or automating one or more tasks such as identification, classification, determination, adaptation, grouping, and generation, among other things. Common types (i.e., classes or techniques) of machine learning include supervised, unsupervised, regression, classification, reinforcement, and clustering, among others.

Among these machine learning types are a number of model implementations, such as linear regression, logistic regression, evolution strategies (ES), convolutional neural networks (CNN), deconvolutional neural networks (DNN), generative adversarial networks (GAN), recurrent neural networks (RNN), and random forest, among others. As known to a person of ordinary skill in the art, one or more machine learning models can be configured and trained for performing one or more tasks at runtime of the model.

As known to a person of ordinary skill in the art, the output of a machine learning model is based at least in part on its configuration and training data. The data that models are trained on (e.g, training data) can include one or more data types. In some embodiments, the training data of a model can be changed, updated, and/or supplemented throughout training and/or inference (i.e, runtime) of the model. In some embodiments, training data corresponds to one or more data types corresponding to software among software environment 200.

A “machine learning module” is a software module and/or hardware module including computer-executable instructions to configure, train, and/or deploy (i.e., execute) one or more machine learning models. In some embodiments, software corresponding to software environment 200 includes one or more machine learning modules.

System

Figure 3:
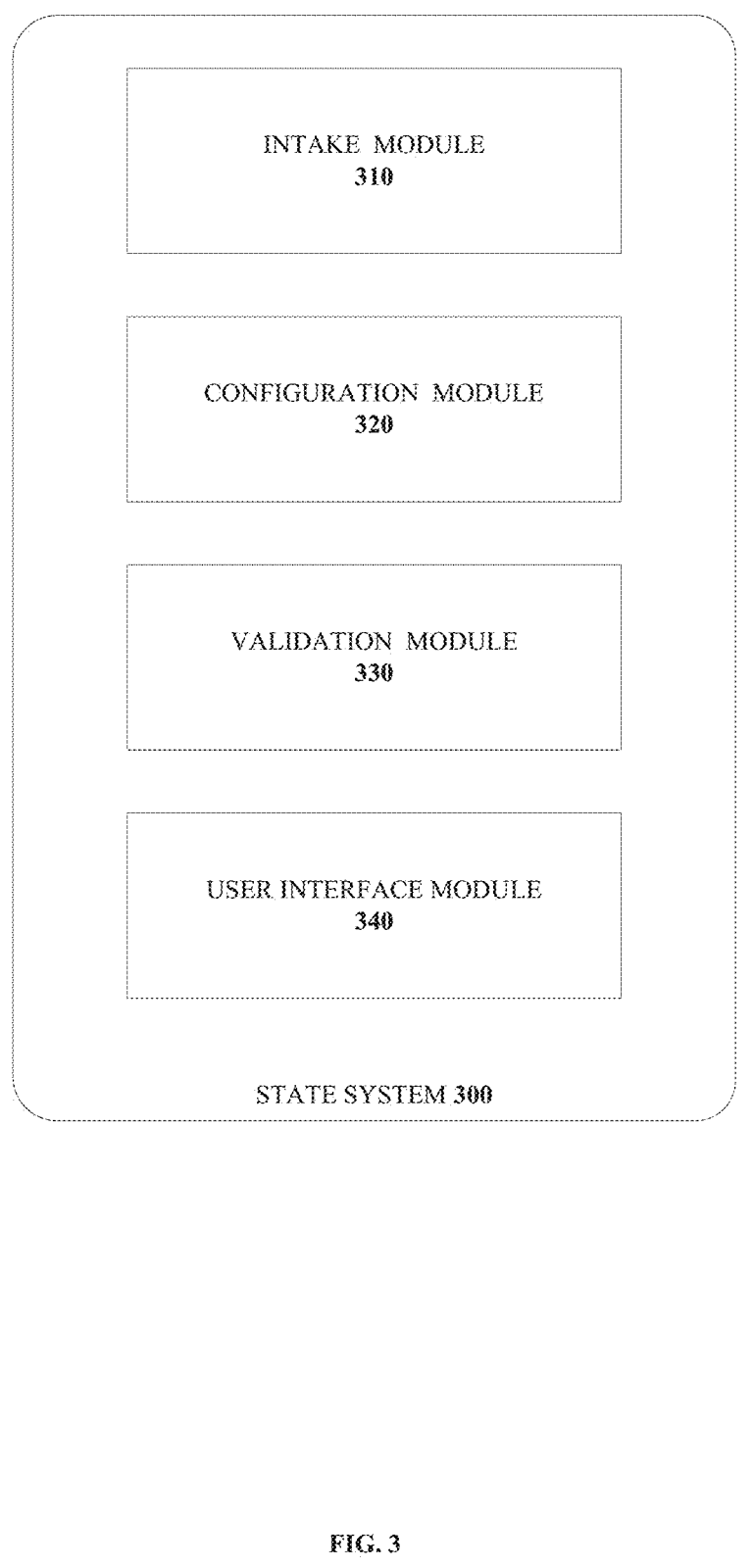

FIG. 3 illustrates an embodiment of state system 300 that includes modules 310, 320, 330 and 340. State system 300 includes computer executable instructions corresponding to a version agnostic centralized state management system for a development environment, video game, and/or virtual social space; similar to development environment 230 and/or game client 210 of FIG. 2. In some embodiments, state system 300 is similar to state system 216 of FIG. 2.

Intake module 310 includes computer executable instructions to request, receive, and/or read data of one or more data types. The data requested, received, and/or read by intake module 310 corresponds to a development environment, video game, and/or virtual social space: including data corresponding to state data hierarchies. In some embodiments, a state data hierarchy and/or node graph is a data structure including data corresponding to nodes, virtual entities, and state data, among other things.

Configuration module 320 includes computer executable instructions that enable the viewing, configuration, and/or interaction with one or more node graphs (e.g., state data hierarchies). Configuration module 320 is configured to access node graphs from data intake module 310, among other things. In some embodiments, a node graph can include a number of sub-node graphs (e.g., secondary node graphs or secondary state data hierarchies), each with their corresponding nodes.

A node graph—as a data structure—provides a centralized state management method (e.g., a usable and/or referenceable data object) for a state system and/or video game to create, maintain, preserve, and/or update the world state of a video game, and/or portion thereof; such as during gameplay. As commonly known to persons of ordinary skill in the art, "world state" or "global state" are terms used to describe and/or refer to the state of virtual entities among a video game. This global state can refer to the state of some or all of the virtual entities within the video game.

The nodes of a node graph can be configured to be associated with a virtual entity and state data thereof, among other things. In some embodiments, each node can be configured to include data corresponding to one or more virtual entities, states of virtual entity, neighboring nodes, node dependencies, and/or other node graphs, among other things. In some embodiments, configuration module 320 is configured to access data corresponding to one or more virtual entities from one or more datastores and/or storage buffers to view, configure, and/or interact with a node among a node graph.

In some embodiments, the connections of nodes (e.g., the design of the node graph or state data hierarchy) among a node graph corresponds to node dependencies (also referred to herein as, or equivalent to, "state dependencies"). A node dependency of a node can correspond to the dependency a first virtual entity (e.g, a node) can have to the state of a second virtual entity. Commonly, node dependencies do not have to be met, fulfilled, or satisfied for the state of a virtual entity to change, which can lead to issues and/or bugs during gameplay, to which the present state system addresses.

Among a node graph, a node can have node dependencies to one or more neighboring nodes. Therefore, a virtual entity can have multiple states and each state can be configured with a unique and/or common state dependency. For example, a state of Virtual Entity C can depend on a state of either Virtual Entity A or Virtual Entity B. As another example, a state of a Virtual Entity A from Node Graph A (e.g., State Data Hierarchy A) can depend on a state of Virtual Entity B from Node Graph B (e.g., State Data Hierarchy B). As another example, the State B of a Virtual Entity A can depend on State A of a Virtual Entity A.

For simplicity, the node that another node depends on (e.g., has a node dependency to) is known as the dependent node. Equivalently, a state that a virtual entity depends on (e.g., has a state dependency to) to change to another state is known as the dependent state. In some embodiments, the state of a virtual entity can depend on another state of that virtual entity.

As virtual entities—or instances thereof—are removed and/or added to one or more portions of a video game and/or virtual social space (e.g., such as during development and/or the creation of user generated content) corresponding nodes and/or node dependencies are removed and/or added among the node graph in response. Changes to virtual entities that cause data corresponding to a node and/or graph to change can also cause a node and/or node graph to be updated. For example, if a change to a virtual entity causes a change to the amount of state dependencies a virtual entity has, then corresponding node dependencies can be added and/or removed among the node graph, and be configured accordingly.

Changes and/or updates to node graphs and/or nodes can be captured (e.g., saved) among a datastore of a corresponding hardware device. In some embodiments, configuration module 320 is configured to automatically add, remove, or configure nodes, node dependencies, and/or node graphs in response to changes to virtual entities. In some embodiments, configuration module 320 is configured to suggest configurations of nodes and/or node graphs in response to changes to virtual entities. In some embodiments, configuration module 320 is configured to prompt a user to configure, update, remove, and/or add one or more nodes and/or node graphs in response to changes to virtual entities.

Validation module 330 includes computer executable instructions that enable automated validation of node dependencies in response to a change in state of a virtual entity that a node among a node graph is associated to, such as during the runtime (e.g., gameplay) of a video game.

In some embodiments, validation module 330 is configured with deterministic logic to validate node dependencies of a node when a state change occurs to an associated and/or corresponding virtual entity of that node. For example, when updating the state data associated with a node, the validation module can validate a node dependency that are unfulfilled and there is more than one path among the node graphs to reach a validation of the node, the validation module 330 can use deterministic logic to determine which node dependencies of node to fulfill (e.g., which path of node dependencies of the node to validate).

In some embodiments, the validation of node dependencies by validation module 330 can be based in part on the design of the node graph and/or state data hierarchy. For example, the connections of nodes among a node graph can represent the designated, expected, and/or designed "path" or "flow" of state dependencies, to which validation module 330 can use when validating node dependencies.

User interface module 340 includes computer executable instructions to provide a user interface to view, configure, and/or interact with node graphs corresponding to virtual entities of a video game and/or virtual social space. In some embodiments, user interface module 340 provides a user interface among a development environment, video game, and/or virtual social space; such as during runtime execution. In some embodiments, user interface module 340 utilizes and/or provides a user interface to the modules of state system 300 including intake module 310, configuration module 320, and validation module 330, among other things.

Process

Figure 4:
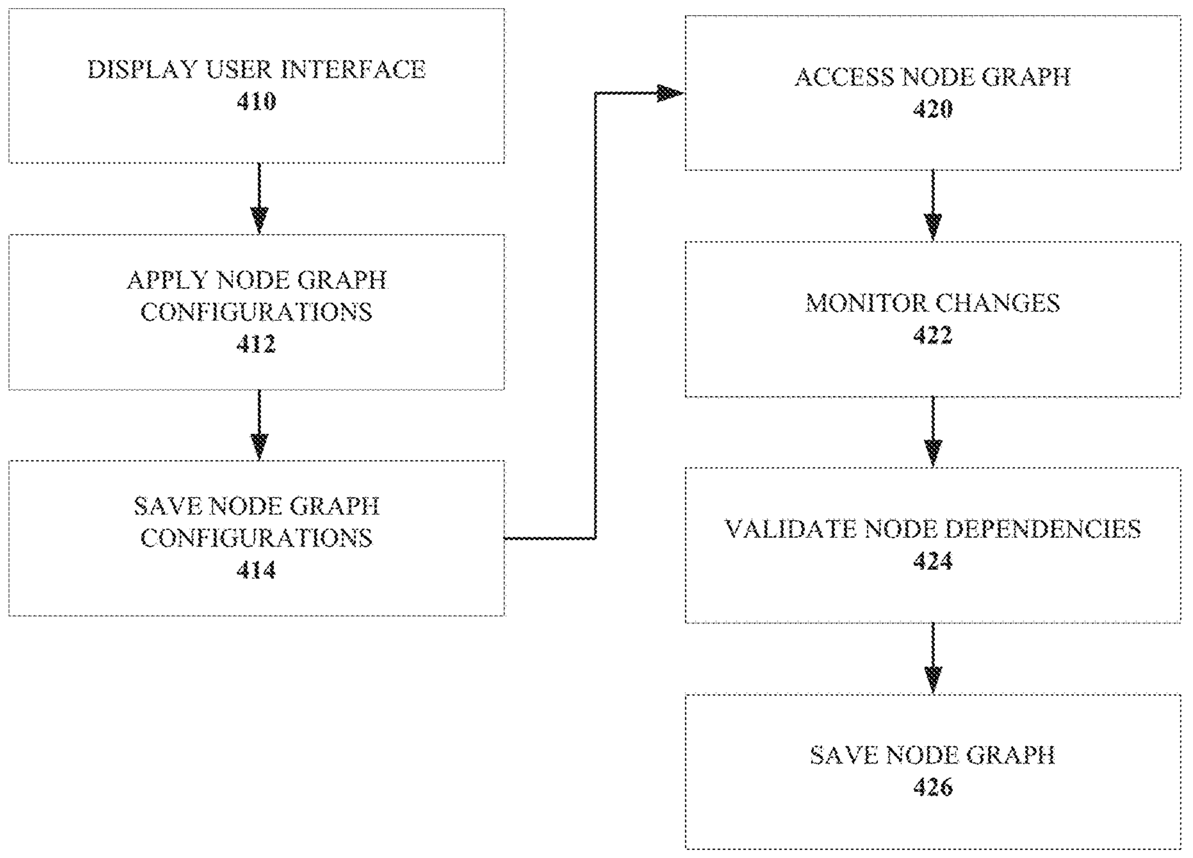
FIG. 4 illustrates an embodiment of a process corresponding to a state system providing version agnostic centralized state management to video games.

FIG. 4 illustrates an embodiment of a state management process 400 corresponding to a state system. In some embodiments, process 400 corresponds to a state system of a video game, similar to state system 300 of FIG. 3.

Steps 410, 412, and 414 correspond to the creation and/or configuration of node graphs (e.g. state data hierarchies) among a state system, such as during development and/or the creation of user generated content. In some embodiments, steps 410, 412, and 414 are performed by and/or among a user interface module of the state system, similar to user interface module 340 of FIG. 3.

At step 410, a state system displays a user interface to view, configure, and/or interact with one or more node graphs. In some embodiments, a state system accesses and/or creates a node graph to display among the user interface at step 410.

At step 412, a state system applies configurations made—by way of user input among the user interface of the state system—to one or more nodes and/or node graphs. In some embodiments, the configurations are applied by a configuration module of the state system, similar to configuration module 320 of FIG. 3.

At step 414, a state system can save the configurations applied to the node graph by a configuration module. In some embodiments, node graphs—and updates thereto—are saved by way of user input among the user interface of the state systems. In some embodiments, node graphs—and updates thereto—are saved periodically by the state system, such as when configurations are applied by a configuration module. In some embodiments, the node graph is saved among a datastore and/or storage buffer of a corresponding hardware device.

Steps 420, 422, 424, 426 and 428 correspond to the use of node graphs (e.g., state data hierarchies) among a state system to provide centralized state management, such as during the runtime (e.g., gameplay session) of a video game.

At step 420, a state system accesses one or more node graph(s) (e.g., reads and/or loads into memory and/or a storage buffer) during the runtime execution of a video game, such as among a gameplay session. In some embodiments, the state system accesses a node graph and/or state data hierarchy that is representative of the world state of a video game, or portion thereof.

At step 422, a state system can provide and maintain a world state to a gameplay session of a video based at least in part on the node graph accessed. In some embodiments, all state data associated with, or corresponding to, each node of the node graphs accessed at step 420 is used to provide and/or load an entire world state. In some embodiments, some state data associated with, or corresponding to, some of the nodes of the node graphs accessed at step 420 is used to provide and/or load a portion of a world state. In some embodiments, step 420 is performed by an intake module similar to intake module 310 of FIG. 3.

At step 424, changes to the state of virtual entities updates corresponding state data (or references thereto) among corresponding nodes of the accessed node graph(s), such as during a gameplay session. In some embodiments, a video game is configured to report and/or transmit updates of state data to a state system when changes of state to virtual entities occur. In some embodiments, a state system is configured to check the state data of virtual entities associated with the nodes among accessed node graphs—either continuously or on a periodic basis over the course of gameplay—to update the state data of nodes.

At step 426, when the state of a virtual entity changes, the state system can validate one or more node dependencies corresponding to the node associated with the virtual entity that changed state during gameplay. A node dependency can be validated when a state change occurs to an associated and/or corresponding virtual entity of that node. For example, when updating the state data associated with a node, the validation module can validate a node dependency that are unfulfilled and there is more than one path among the node graphs to reach a validation of the node. The validation process can use deterministic logic to determine which node dependencies of node to fulfill (e.g., which path of node dependencies of the node to validate).

At step 428, a state system can save the node graph to one or more datastores and/or storage buffers among a corresponding hardware device. In some embodiments, saving the node graph includes saving the updated state information—or reference thereto or thereof—of nodes associated with virtual entities that changed state during gameplay. In some embodiments, the state system saves the node graphs to capture the updates to states of virtual entities periodically over the course of gameplay.

As a result, a video game and/or state system is able to utilize one or more node graphs to initialize and/or maintain the state of virtual entities (e.g., state management) over the course of gameplay. Once saved, the world state of a video game is preserved among the saved node graphs. Thereafter, the saved node graphs can be accessed and/or loaded in subsequent gameplay sessions to enable users to continue a video game at its saved and/or preserved world state. As such, process 400 provides one embodiment for centralized state management among video games, that can be used among a number of game sessions to create a persisting world state of the video game.

The steps and process of FIG. 4 can be associated to one or more hardware and/or software modules configured with computer-executable instructions. A person of ordinary skill in the art would recognize and appreciate how the proceeding process may be configured in a number of ways, such that one or more of steps are performed before, after, or simultaneously among other steps, and/or otherwise omitted or substituted in whole or in part.

Figure 5:
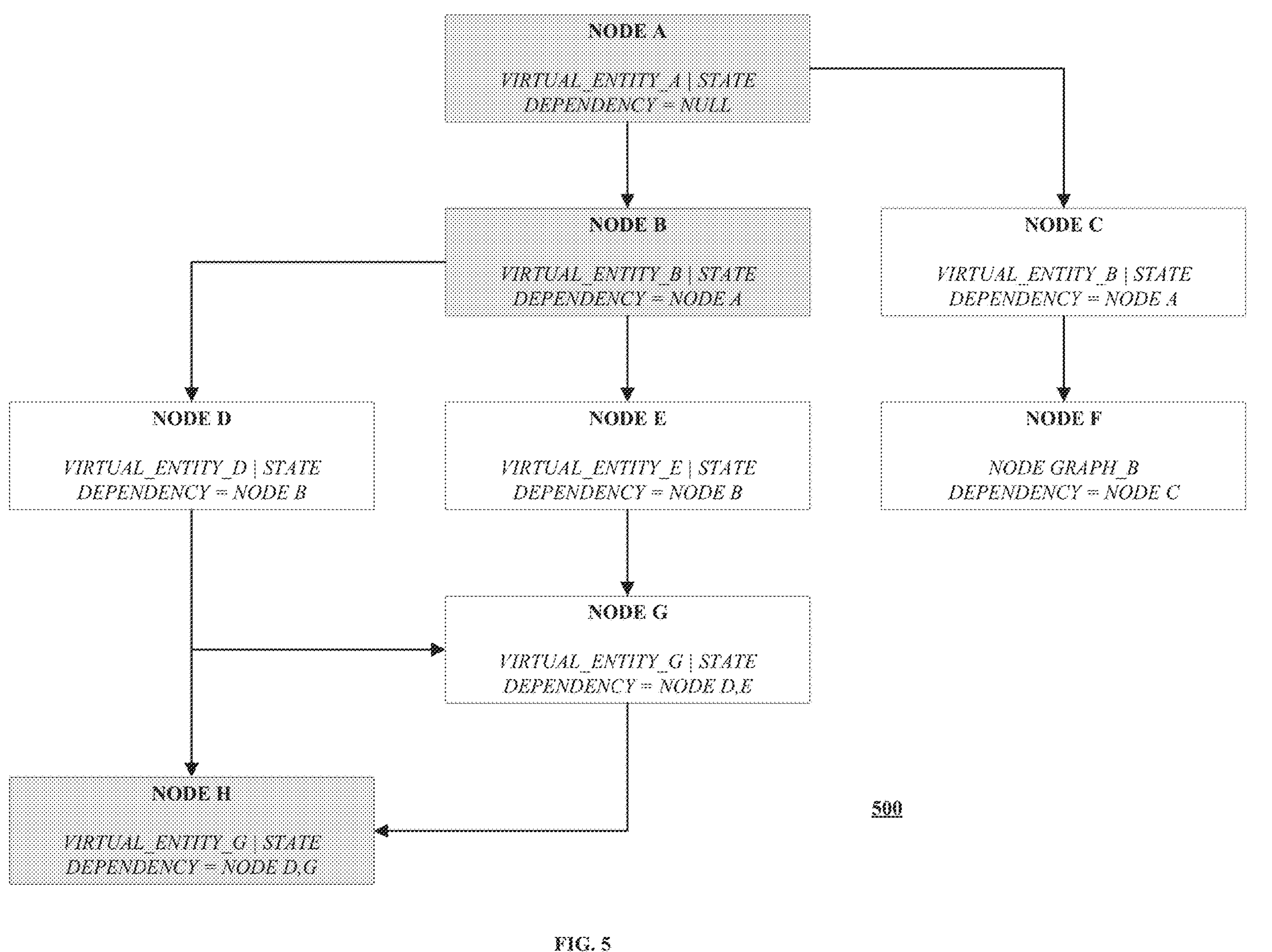
FIG. 5 illustrates an embodiment of a node graph.

FIG. 5 illustrates an embodiment of a node graph 500. In some embodiments, node graph 500 corresponds to a state data hierarchy of a video game that is used by a state system, similar to state system 300 of FIG. 3.

Node graph 500 illustrates a state data hierarchy corresponding to a video game as a number of connected nodes (Node A through Node H). In some embodiments, each node among node graph 500 includes data and/or references, as previously described among FIG. 3.

As a non-limiting illustrative example, Nodes A, B, C, D, E, G, and H among node graph 500 includes data corresponding to a virtual entity, a state of the virtual entity, a node dependency, among other things. Additionally, Node F is illustrated as a node corresponding to Node Graph G with a dependency to Node C. In some embodiments, Node Graph G is a node graph that works in conjunction with node graph 500 to form a state data hierarchy. In some embodiments, Node Graph G is a sub-node graph of node graph 500.

In some embodiments, the connections of nodes among node graph 500 correspond to node dependencies. As such, the validation of node dependencies by a state system at runtime can be based at least in part on the connections of the node among node graph 500 (e.g., the design of the node graph). For example, the connections of nodes among a node graph can represent the designated, expected, and/or designed "path" or "flow" of state dependencies, to which validation module can use when validating node dependencies with unfulfilled states among node graph 500.

The validation of node dependencies by a state system at runtime can also be based at least in part on deterministic logic of a validation module, similar to validation module 330 of FIG. 3. In some embodiments, a validation module can determine which "path" to validate node dependencies based at least in part on a current state change and/or previous state changes.

As a non-limiting example, the nodes among node graph 500 can correspond to virtual entities with binary states (e.g., active or inactive). A binary state pair for a virtual entity can include, but is not limited to: active and inactive, on and off, open and closed, high and low, near and far, moving or stopped, among other binary state pairs of the like. For simplicity in illustration, nodes among node graph 500 are illustrated with gray color to represent an "active" state. In accordance with the present example, node dependencies among node graph 500 are met when the virtual entity corresponding to the dependent node is in an active state.

Here, Nodes A, B, and H are illustrated in gray to represent an active state of virtual entities resulting from user interaction during gameplay of a video game. Node A does not have a node dependency, Node B has a dependency to Node A, and Node H has node dependencies to Node G and Node D. As such, when user interaction first causes the virtual entity corresponding to Node A to switch to an active state there is no state dependency for a validation module of a state system to validate, therefore, the node graph can simply reference the update in state of the virtual entity. Similarly, when user interaction causes the virtual entity corresponding to Node B to switch to an active state there is also no state dependency for a validation module of a state system to validate since the state of the virtual entity corresponding to Node A is already actively, thereby satisfying Node B's dependency to Node A.

When user interaction causes the virtual entity corresponding to Node H to switch to an active state a validation module of a state system can determine which node dependencies corresponding to Node H should be validated. Since the previous node corresponding to the node dependencies of Node H is Node B, a validation module must determine which path of node dependencies to validate from Node B to Node H (or from Node H to Node B).

Since Node H has a dependency to at least one of either Node D or Node G, there are two paths from Node B to Node H among node graph 500. The first path is: Node B to Node D to Node H, which is the shortest path of node dependencies. The second path is Node B to Node E to Node G to Node H, which is the longest path of node dependencies.

In some embodiments, the deterministic logic corresponding to the validation module of a state system can be configured to validate the shortest path of node dependencies. In some embodiments, the deterministic logic corresponding to the validation module of a state system can be configured to validate all node dependencies.

In some embodiments, the deterministic logic corresponding to the validation module of a state system can be configured to take the path of node dependencies that is most beneficial to the player. For example, if Node E and Node G correspond to virtual entities that are associated with advancing the progression of a quest that a player character is currently involved in, whereas Node D is not, then the validation module can choose to validate Node E and Node G to further assist and/or advance the user in the progression of the quest.

As such, when a validation module of a state system validates a node dependency, it causes the virtual entities corresponding to the node dependencies to change to a state that would satisfy the corresponding dependency. In the present example, the validation module can cause Node D, E, and/or G to switch to an active state based at least in part on its determination for validation.

Computing Device

Figure 6:
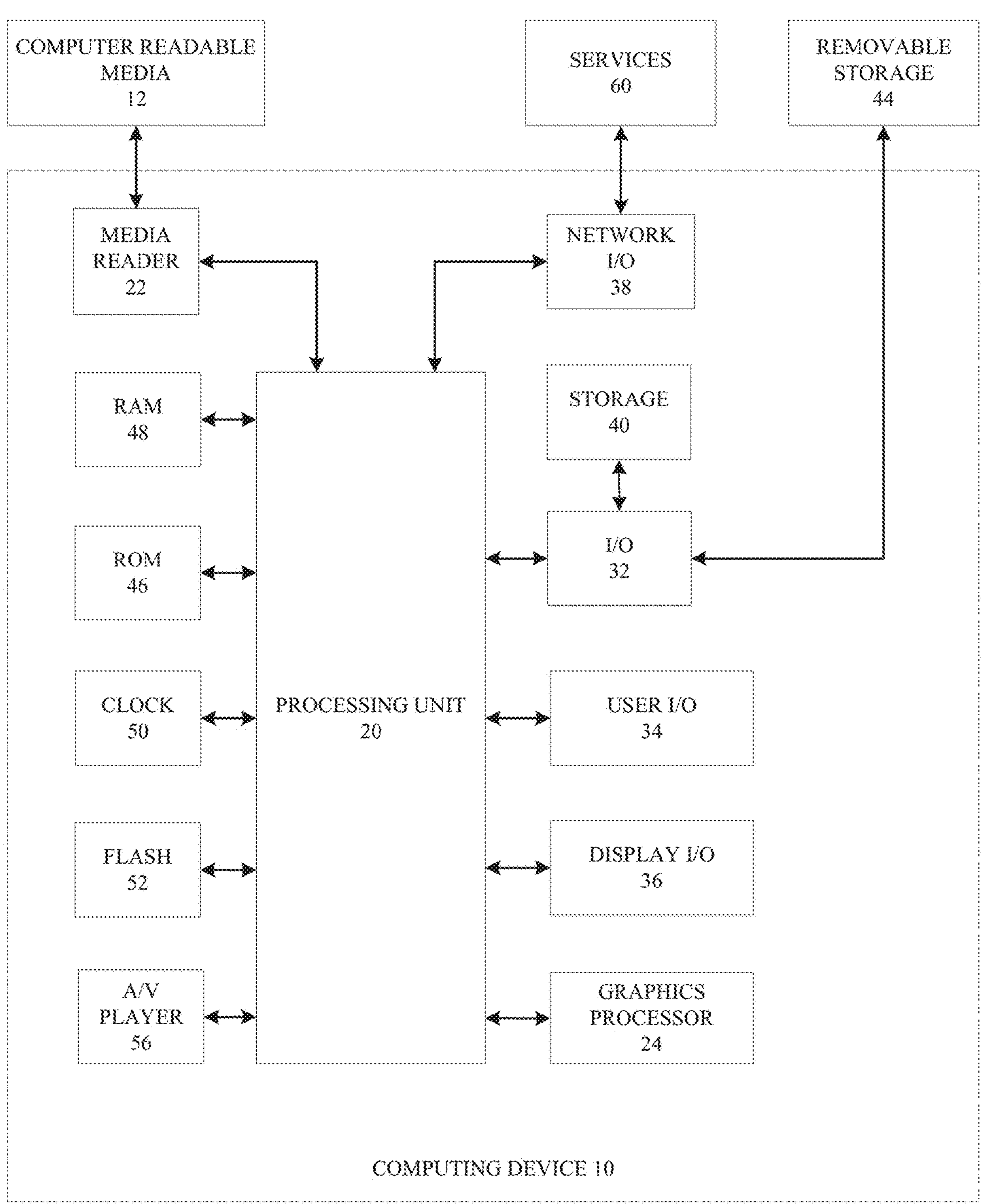
FIG. 6 illustrates an embodiment of a computing device.

FIG. 6 illustrates an example embodiment of the resources within a computing device 10. In some embodiments, some or all of the aforementioned hardware devices—such as computing devices 110 and server devices 130 of FIG. 1—are similar to computing device 10, as known to those of skill in the art.

Other variations of the computing device 10 may be substituted for the examples explicitly presented herein, such as removing or adding components to the computing device 10. The computing device 10 may include a video game console, a smart phone, a tablet, a personal computer, a laptop, a smart television, a server, and the like.

As shown, the computing device 10 includes a processing unit 20 that interacts with other components of the computing device 10 and external components. A media reader 22 is included that communicates with computer readable media 12. The media reader 22 may be an optical disc reader capable of reading optical discs, such as DVDs or BDs, or any other type of reader that can receive and read data from computer readable media 12. One or more of the computing devices may be used to implement one or more of the systems disclosed herein.

Computing device 10 may include a graphics processor 24. In some embodiments, the graphics processor 24 is integrated into the processing unit 20, such that the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a video game console device, a general-purpose laptop or desktop computer, a smart phone, a tablet, a server, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data. In addition to storage 40 and removable storage media 44, computing device 10 is also shown including ROM (Read-Only Memory) 46 and RAM 48. RAM 48 may be used for data that is accessed frequently during execution of software.

User I/O 34 is used to send and receive commands between processing unit 20 and user devices, such as keyboards or game controllers. In some embodiments, the user I/O can include a touchscreen. The touchscreen can be a capacitive touchscreen, a resistive touchscreen, or other type of touchscreen technology that is configured to receive user input through tactile inputs from the user. Display I/O 36 provides input/output functions that are used to display images. Network I/O 38 is used for input/output functions for a network. Network I/O 38 may be used during execution, such as when a client is connecting to a server over a network.

Display output signals produced by display I/O 36 comprising signals for displaying visual content produced by computing device 10 on a display device, such as graphics, GUIs, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such as display 16.

The computing device 10 can also include other features, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48, or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

Some portions of the detailed descriptions above are presented in terms of symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The disclosed subject matter also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The disclosed subject matter may be provided as a computer program product, or software, that may include a machine-readable medium having stored thereon instructions, which may be used to program a computer system (or other electronic devices) to perform a process according to the disclosed subject matter. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Certain example embodiments are described above to provide an overall understanding of the principles of the structure, function, manufacture and use of the devices, systems, and methods described herein. One or more examples of these embodiments are illustrated in the accompanying drawings. Those skilled in the art will understand that the descriptions herein and the accompanying drawings are intended to be illustrative, and not restrictive. Many other implementations will be apparent to those of skill in the art based upon the above description. Such modifications and variations are intended to be included within the scope of the present disclosure. The scope of the present disclosure should, therefore, be considered with reference to the claims, along with the full scope of equivalents to which such claims are entitled. The features illustrated or described in connection with one exemplary embodiment may be combined with the features of other embodiments. In some instances, well-known structures and devices are shown in block diagram form, rather than in detail, in order to avoid obscuring the disclosed subject matter.

What is claims is:

1. A system comprising:

one or more processors; and one or more memory devices communicatively coupled to the one or more processors, the one or more memory devices storing computer-executable instructions corresponding to a video game that, among a gameplay session of the video game during runtime execution, causes at least one of the one or more processors to maintain a world state to a plurality of virtual entities by:

accessing a node graph comprising a plurality of nodes, wherein the node graph is a data structure corresponding to a state data hierarchy of the video game, wherein each node comprises data corresponding to at least:

(i) an association to a virtual entity, (ii) state data of the associated virtual entity, and (iii) one or more node dependencies, wherein each node dependency indicates a dependent node of the node;

providing state data to the plurality of virtual entities based at least in part on the node graph;

updating state data of at least a first node in response to a state of the virtual entity associated with the first node changing during the gameplay session; and validating at least one of the one or more node dependencies of the first node using a node path of node dependencies, wherein the validation includes updating state data of at least one dependent node of the first node.

2. The system of claim 1, wherein the node path is the shortest path when there are two or more available node paths to validate the first node.

3. The system of claim 2, wherein one or more nodes among the node graph comprise data corresponding to at least: (i) an association to a secondary node graph comprising a plurality of nodes, and (ii) a node dependency.

4. The system of claim 3, wherein user interaction among the gameplay session causes a change in state to a virtual entity.

5. The system of claim 4, wherein the updating state data of nodes includes saving the node graph among a datastore to update the world state.

6. The system of claim 5, wherein a validation of node dependencies is based at least in part on the state data hierarchy of the video game.

7. The system of claim 6, wherein a validation of a node dependency includes the validation of a node dependency corresponding to the dependent node.

8. A computer implemented method to maintain a world state to a plurality of virtual entities among a gameplay session comprising:

accessing a node graph comprising a plurality of nodes, wherein the node graph is a data structure corresponding to a state data hierarchy of a video game, wherein each node comprises data corresponding to at least:

(i) an association to a virtual entity, (ii) state data of the associated virtual entity, and (iii) one or more node dependencies, wherein each node dependency indicates a dependent node of the node;

providing state data to the plurality of virtual entities based at least in part on the node graph;

updating state data of at least a first node in response to a state of the virtual entity associated with the first node changing during the gameplay session; and validating at least one of the one or more node dependencies of the first node using a node path of node dependencies, wherein the validation includes updating state data of at least one dependent node of the first node.

9. The method of claim 8, wherein the node path is the shortest path when there are two or more available node paths to validate the first node.

10. The method of claim 9, wherein one or more nodes among the node graph comprise data corresponding to at least: (i) an association to a secondary node graph comprising a plurality of nodes, and (ii) a node dependency.

11. The method of claim 10, wherein user interaction among the gameplay session causes a change in state to a virtual entity.

12. The method of claim 11, wherein the updating state data of nodes includes saving the node graph among a datastore to update the world state.

13. The method of claim 12, wherein a validation of node dependencies is based at least in part on the state data hierarchy of the video game.

14. The method of claim 13, wherein a validation of a node dependency includes the validation of a node dependency corresponding to the dependent node.

15. A non-transitory computer readable medium storing instructions that, when executed by one or more processors, causes the one or more processors to maintain a world state to a plurality of virtual entities among a gameplay session comprising:

accessing a node graph comprising a plurality of nodes, wherein the node graph is a data structure corresponding to a state data hierarchy of a video game, wherein each node comprises data corresponding to at least:

(i) an association to a virtual entity, (ii) state data of the associated virtual entity, and (iii) one or more node dependencies, wherein each node dependency indicates a dependent node of the node;

providing state data to the plurality of virtual entities based at least in part on the node graph;

updating state data of at least a first node in response to a state of the virtual entity associated with the first node changing during the gameplay session; and validating at least one of the one or more node dependencies of the first node using a node path of node dependencies, wherein the validation includes updating state data of at least one dependent node of the first node.

16. The non-transitory computer readable medium of claim 15, wherein the node path is the shortest path when there are two or more available node paths to validate the first node.

17. The non-transitory computer readable medium of claim 16, wherein one or more nodes among the node graph comprise data corresponding to at least: (i) an association to a secondary node graph comprising a plurality of nodes, and (ii) a node dependency.

18. The non-transitory computer readable medium of claim 17, wherein user interaction among the gameplay session causes a change in state to a virtual entity.

19. The non-transitory computer readable medium of claim 18, wherein the updating state data of nodes includes saving the node graph among a datastore to update the world state.

20. The non-transitory computer readable medium of claim 19, wherein a validation of node dependencies is based at least in part on the state data hierarchy of the video game.

* * * * *